United States Patent
Ochsenreither

(10) Patent No.: US 6,366,976 B1
(45) Date of Patent: Apr. 2, 2002

(54) DEVICE FOR CONNECTING A SUBSCRIBER TO A BUS LINE

(75) Inventor: Peter Ochsenreither, Berg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/637,904

(22) Filed: Aug. 14, 2000

Related U.S. Application Data

(63) Continuation of application No. PCT/DE99/00393, filed on Feb. 11, 1999, which is a continuation of application No. PCT/DE99/00394, filed on Feb. 11, 1999.

(30) Foreign Application Priority Data

Feb. 13, 1998 (DE) ..................................... 298 02 482 U
Feb. 13, 1998 (DE) ..................................... 298 02 483 U

(51) Int. Cl.[7] .......................... H04B 3/02; G06F 13/362
(52) U.S. Cl. ....................................... 710/305; 375/220
(58) Field of Search ................................ 710/129, 130, 710/305; 375/220, 377, 257, 211, 212, 213; 340/825.5

(56) References Cited

U.S. PATENT DOCUMENTS

| | | | |
|---|---|---|---|
| 4,633,462 A | * | 12/1986 | Stifle |
| 4,972,513 A | * | 11/1990 | Mochizuki et al. |
| 5,623,611 A | | 4/1997 | Matsukawa et al. ........ 395/309 |
| 5,815,528 A | * | 9/1998 | Koga et al. ................. 375/220 |

FOREIGN PATENT DOCUMENTS

| | | |
|---|---|---|
| DE | 28 54 655 C2 | 7/1979 |
| DE | 195 26 801 A1 | 1/1997 |
| EP | 0 447 001 A2 | 9/1991 |
| GB | 1 572 595 | 7/1980 |

OTHER PUBLICATIONS

Paret D: "Applications du Bus Can" *Electronique Radio Plans*, Nr. 541, Dec. 1, 1992, pp. 63–69.

Färber, George, et al., Bussysteme,. "Parallele und serielle Bussysteme, lokale Netze", Oldenbourg Verlag, München, Wien, 1987, pp. 95–105.

Blaesner, W. "PCs Preiswert Ueber Zweidrahtleitungen Vernetzen" *Elektronik* vol. 18, 1993, pp. 42–48.

* cited by examiner

Primary Examiner—Paul R. Myers
(74) Attorney, Agent, or Firm—Sughrue Mion, PLLC

(57) ABSTRACT

The invention relates to a device (13) for connecting a subscriber (8) to a bus line (11) for the bi-directional transmission of data. The subscriber (8) is connected via a branch line (12) to the device (13). The branch line (12) is, from the standpoint of line technology, decoupled from the bus line (11) by means of an amplifier circuit (15,16), so that no reflections or interferences are coupled into the bus line (11), which would otherwise occur through the connection of the subscriber (8). Preferably, the subscriber (8) supplies the power needed to operate the device (13). A transmission direction detection circuit (17; 24, 26, 29) has a passive part (24) and a few active components (26, 29). Preferably, the subscriber (8) supplies the power needed to operate the circuit (17; 24, 26, 29).

9 Claims, 4 Drawing Sheets

US 6,366,976 B1

DEVICE FOR CONNECTING A SUBSCRIBER TO A BUS LINE

This is a Continuation of International Applications PCT/DE99/00393 and PCT/DE99/00394, both having an international filing date of Feb. 11, 1999. The disclosures of both PCT Applications are incorporated into this application by reference.

FIELD AND BACKGROUND OF THE INVENTION

The invention generally relates to a device for connecting a subscriber to a bus line. In addition, the invention relates to a circuit for determining the transmission direction of such a device for connecting a subscriber to a bus line.

Various generally known possibilities for connecting subscribers to a bus line 1 are represented in FIG. 2. In the example shown, data are transmitted on the bus line 1 with differential signals. For this purpose, the bus line 1 possesses two signal cores B and A, on which the data are represented in voltage-level-coded form, and a shielding C to shield the line against interference. An example of a voltage-level-coded embodiment, is the RS 485 interface, in which a voltage differential between the cores B and A greater than 0.2 V is interpreted as the digital value "1" and a voltage differential of less than –0.2 V is interpreted as the digital value "0." The transmission of data is bi-directional, that is, data can be transmitted in both directions. The subscribers 2 and 5 are disposed at opposite ends of the bus line 1. Since the length of the bus line 1 can be several hundred meters, a termination for the suppression of interfering reflections at the end of the line is provided in the subscribers 2 and 5. This termination can, for example, include a 390 Ω resistor between a 5 V power supply and the signal core B, a 220 Ω resistor between the signal core B and the signal core A, and a 390 Ω resistor between the signal core A and the ground. This termination corresponds essentially to the characteristic wave impedance of the bus line 1. The termination in each of the subscribers 2 and 5 is marked by a T in a rectangular box. By thus dimensioning the termination resistors, the idle state or resting state on the bus 1, i.e., the voltage differential, resulting from highly ohmic outputs of the subscribers 2 . . . 5, is determined to be about 1 V. At the inputs of the subscribers, this idle state is interpreted as the digital value "1." The bus line 1 is looped through a subscriber 4, which is located somewhere between the two ends, without noteworthy changes of the characteristic wave impedance. Thus, no termination is required for this subscriber. A subscriber 3 is connected to the bus line 1 by a branch line 6. This arrangement is preferred, for example, when a subscriber is not located in the immediate vicinity of the bus line and if it is difficult, due e.g. to the stiffness of the bus line, to run the bus line to the subscriber. At a data rate of up to 1.5 MBaud, a length "a" of the branch line 6 should be at most 1.5 m, since the branching point at the connection point of the branch line 6 to the bus line 1 causes a disturbance of the characteristic wave impedance and reflections. These reflections arise at the subscriber 3, which is connected, without termination, to the branch line 6. The reflections run back, via the branch line 6, into the bus line 1, and interfere with the data transmission. A subscriber connection of this type thus reduces the transmission reliability of a bus system.

OBJECTS OF THE INVENTION

It is one object of the invention to provide a device with which a subscriber is easily connected to a bus line even if the subscriber is not located in the immediate vicinity of the bus line. It is a further, related object to provide such a device whereby the transmission reliability of the bus system is not significantly worsened by the connection of the subscriber.

Normally, a connection device of this type would require a signal for controlling the data transmission direction. However, subscribers, which are designed for bi-directional transmission of data, in general do not provide such a signal on their bus interface, since it is not needed in the normal case when the subscriber is connected directly to its bus interface on the bus system. Accordingly, it is a further object of the invention to provide a circuit for determining the transmission direction in the connection device. Yet another object of the invention is to provide such a circuit that can be set up cost-effectively and with ease.

SUMMARY OF THE INVENTION

These and other objects of the invention are achieved by a device to connect a subscriber to a bus line for bi-directional data transmission as well as by a transmission direction detection circuit for such a device. According to one formulation of the invention, the device includes a branch line to connect the subscriber with the device. The device furthermore includes an amplifier circuit to selectively transmit signals from the bus line to the branch line and from the branch line to the bus line. The amplifier circuit has a high-resistance input at the bus line and has outputs, which are switched between an active operation mode and an inactive operation mode. In the active operation mode, a respective connected one of the bus line and the branch line is driven by the signals received by a respective other one of the branch line and the bus line. In the inactive operation mode, at least one of the outputs has a high resistance.

The device also includes a direction determination circuit to detect if the signals are to be transmitted from the bus line to the branch line or from the branch line to the bus line, and to activate a respective one of the outputs.

According to another formulation of the invention, the transmission direction determination circuit includes a branch line connection to connect the subscriber to the transmission direction detection circuit. The transmission direction detection circuit also includes an amplifier circuit transmitting signals from the bus line to the branch line. Therein, the data transmission on the branch line is digitally voltage-level-coded with predetermined response thresholds to detect digital values. Furthermore, the transmission direction detection circuit includes a first resistor network and a first buffer generating a first determination signal. The first resistor network corresponds substantially to a star connection and includes a first series resistor and a second series resistor. The first resistor is arranged between a first star point of the star connection and an input of the first buffer. The second series resistor is arranged between the first star point and the at least one output of the amplifier circuit. Therein, the at least one output is located on a side of the branch line of the amplifier circuit. In addition, the first resistor network includes a connection of the first star point with the branch line and clamp resistors at the input of the first buffer and at the branch line against power supply voltages.

The first series resistor, the second series resistor, and the first clamp resistors are dimensioned such that a first change of a voltage level (which is supplied from the at least one output of the amplifier circuit to the first resistor network and which corresponds to a change of at least one of the digital values) changes the voltage level on the branch line such that the change of the at least one digital value is detected at a connected input of the subscriber. Therein, the first change of the level changes the level at the input of the first buffer only slightly so that the change of the at least one digital value is not detected at the first buffer.

Furthermore, the first series resistor, the second series resistor, and the first clamp resistors are dimensioned such that a second change of the voltage level (which is supplied from the branch line to the first resistor network and which corresponds to the change of the at least one digital value) changes the level at the input of the first buffer such that the change of the digital value is detected by the first buffer.

It is one advantage of the invention that a subscriber is connected to the bus line via a branch line, wherein the quality of the signals on the bus line is not worsened. With a device according to the invention, if necessary, longer branch lines and/or higher data rates can be used. The bus line is looped through the device for connecting the subscriber. Therein, no noteworthy changes of the characteristic wave impedance occur, so that the quality of the signals on the bus line is only insignificantly affected by the connection of the subscriber. No interfering reflections are coupled into the bus lines by the subscriber, which is connected via the branch line with the new connection device. In an advantageous manner, the new connection device requires no changes or adaptations of the subscriber, since no additional signals are needed for controlling the transmission. In particular, the subscriber does not have to supply a directional control signal, indicating the direction of the instantaneous flow of data to the connection device.

Depending on the type of signals on the bus line, the connection device on the bus line side performs a change of level, an electrical isolation, a current/voltage conversion, or an optoelectrical conversion for the connection to a light wave guide as the bus line. Therein, the function of the direction determination circuit is not affected and the amplifier circuit on the bus line side is adapted in a simple manner to the respective application at hand.

It is another advantage of the invention that the determination of the transmission direction is performed, in essence, by a passive resistor network. Thus, only few active components are needed. The circuit is furthermore characterized by a low current-consumption and cost-effective manufacture. Due to the low current-consumption of the direction determination circuit, the auxiliary energy required for the operation of the connection device can be provided, in most cases, by the subscriber, so that no additional power supply is required.

BRIEF DESCRIPTION OF THE DRAWINGS

The invention and further advantageous refinements of the invention according to the features of the dependent claims are explained in more detail below with the aid of diagrammatic, exemplary embodiments in the drawings, in which:

DETAILED DESCRIPTION OF PREFERRED EMBODIMENTS

Figure 1:
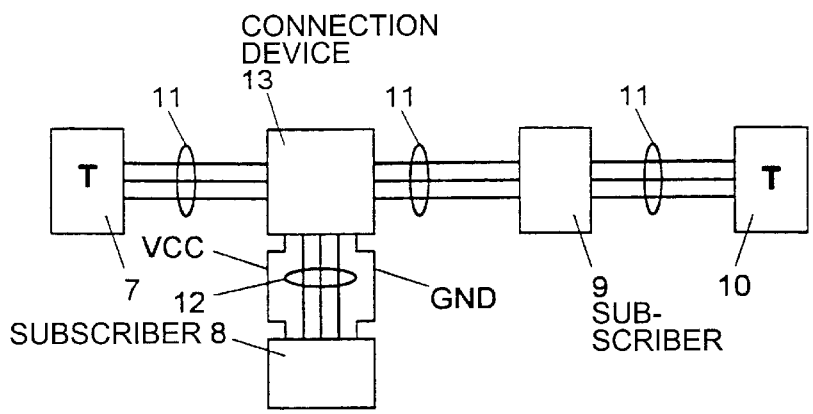
FIG. 1 shows a block circuit diagram of a bus system with a connection device according to the invention.
Figure 2:
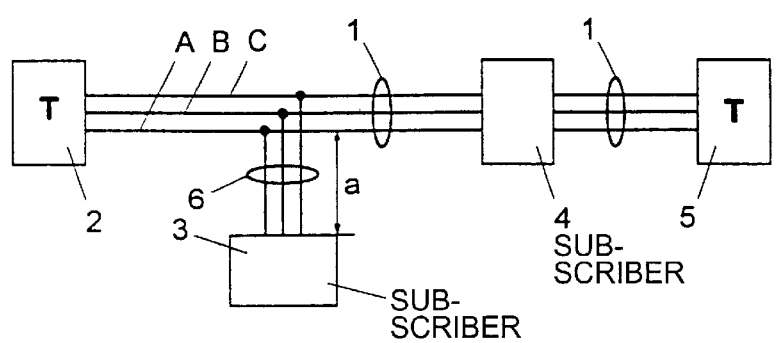
FIG. 2 shows a bus system for the explanation of the related art.

In a bus system according to FIG. 1, which, for example, meets the RS 485 specification, four subscribers 7, 8, 9 and 10 are connected to a three-core bus line 11. The subscriber 8, which is e.g. not located in the immediate vicinity of the bus line 11, is connected by a branch line 12 to a connection device 13 through which the bus line 11 is looped. In addition to the three cores of the branch line 12, power supply voltages VCC and GND are supplied from the subscriber 8 to the connection device 13 in order to operate the connection device 13 without a separate connection to a power supply. These power supply voltages are necessary, since the connection device 13 includes active components, for example an amplifier circuit for selective transmission of signals from the bus line 11 to the branch line 12 or in the reverse direction. The bus line 11 and the branch line 12 are electrically decoupled by the components in the connection device 13, so that reflections, which can arise at the end of the branch line in the subscriber 8, are not coupled into the bus line 11 via the connection device 13. To avoid reflections at the ends of the bus line 11, a respective termination is introduced into the subscribers 7 and 10. A bus system of this type is capable of being operated also at high frequencies, for example with a data rate of 12 MBaud.

Figure 3:
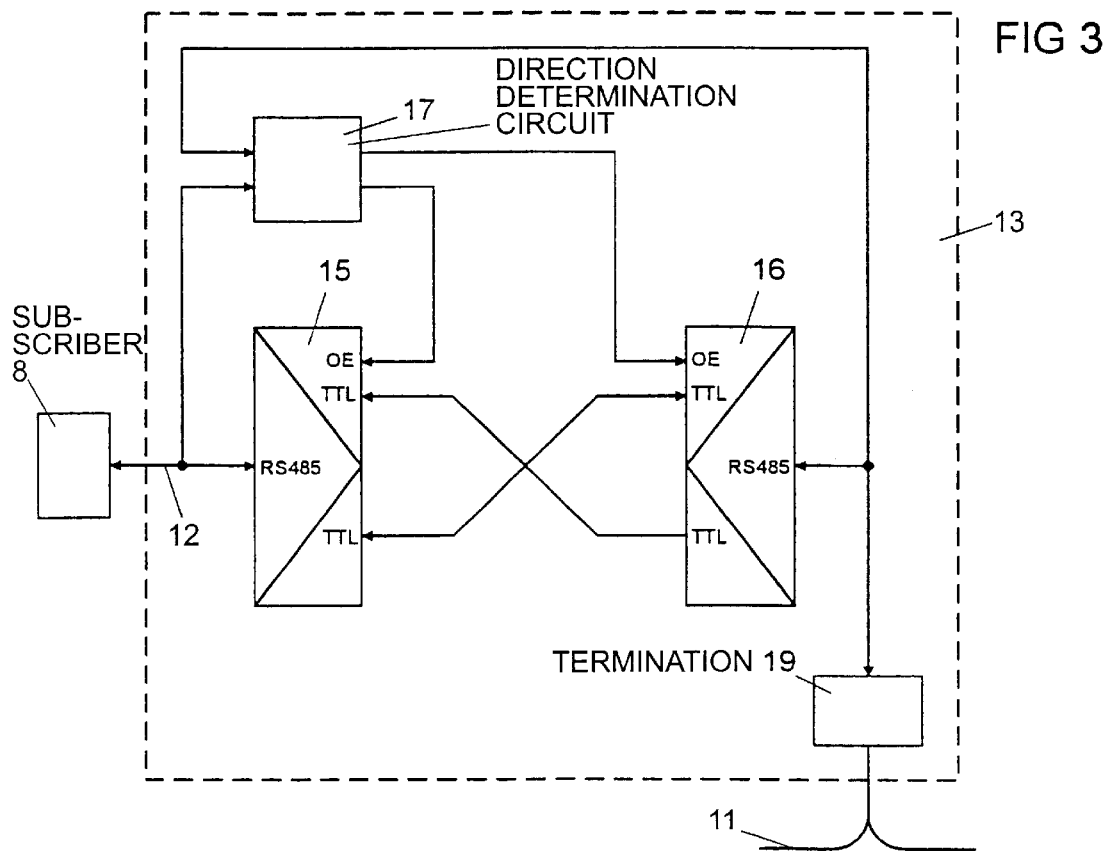
FIG. 3 shows a block circuit diagram of a connection device according to the invention.

FIG. 3 shows the schematic layout of a connection device according to the invention. The connection device 13 includes an amplifier circuit, which has two bi-directional TTL/RS 485 converters 15 and 16, for example of the type 75ALS176B from Texas Instruments, as well as a direction determination circuit 17. In order to dispose the connection device 13 at an arbitrary point on a bus line 11, the connection device 13 is additionally provided with a termination 19, which is optionally switched on or off. A subscriber 8 is connected via a branch line 12 to the connection device 13. The amplifier circuit with the TTL/RS 485 converters 15 and 16 serves for the alternating transmission of signals from the bus line 11 to the branch line 12 or from the branch line 12 to the bus line 11. The input of the converter 16 on the bus line side has a high resistance value, so that the signals on the bus line side 11, in a receiving mode, are not influenced by the connection device 13. The outputs of the TTL/RS 485 converters 16 and 15 on the bus line 11 and the branch line 12 are switched between an active and an inactive mode of operation. In the active mode of operation, the respective connected line is driven with the signals that are received by the respective other line. On the other hand, in the inactive mode of operation, the respective output has a high resistance value. The setting of the modes of operation is done by a signal at an input OE (output enable) of the converters 15 and 16. The signals required for this are generated by the direction determination circuit 17. The signals of the bus line 11 as well as the signals of the branch line 12 are supplied to the direction determination circuit 17. The direction determination circuit detects whether signals are to be transmitted from the bus line 11 to the branch line 12 or from the branch line 12 to the bus line 11 and activates the respective output by applying suitable signals at the inputs OE of the converters 15 and 16. In the shown exemplary embodiment, the bus system with the bus line 11 as well as the connection to the branch line 12 meets the RS 485 specification. However, the invention is also applicable to other interfaces or bus systems.

In the following, one alternative for determining the transmission direction is described:

The direction determination starts from the resting state, in which the outputs of the converters 15 and 16 are switched into the inactive mode of operation. The bus line 11 and the branch line 12 are sampled by the direction determination circuit 17 and monitored to determine whether data are to be transmitted. If signals representing data occur on one side, for example on the side of the bus line 11, then the converter of this side, in this example the converter 16, is left in the inactive mode of operation and operated as a receiver. The received signals are internally forwarded to the converter 15, which is switched by the direction determination circuit 17 into the active mode of operation. The converter 15 thus transmits the data received from the bus line 11 via the branch line 12 to the subscriber 8. If no further signals are received, then both sides are switched to the receiving mode again, that is, the converters 15 and 16 are switched into the inactive mode of operation. In corresponding manner, data is also transmitted in the reverse direction, as needed.

Figure 4:
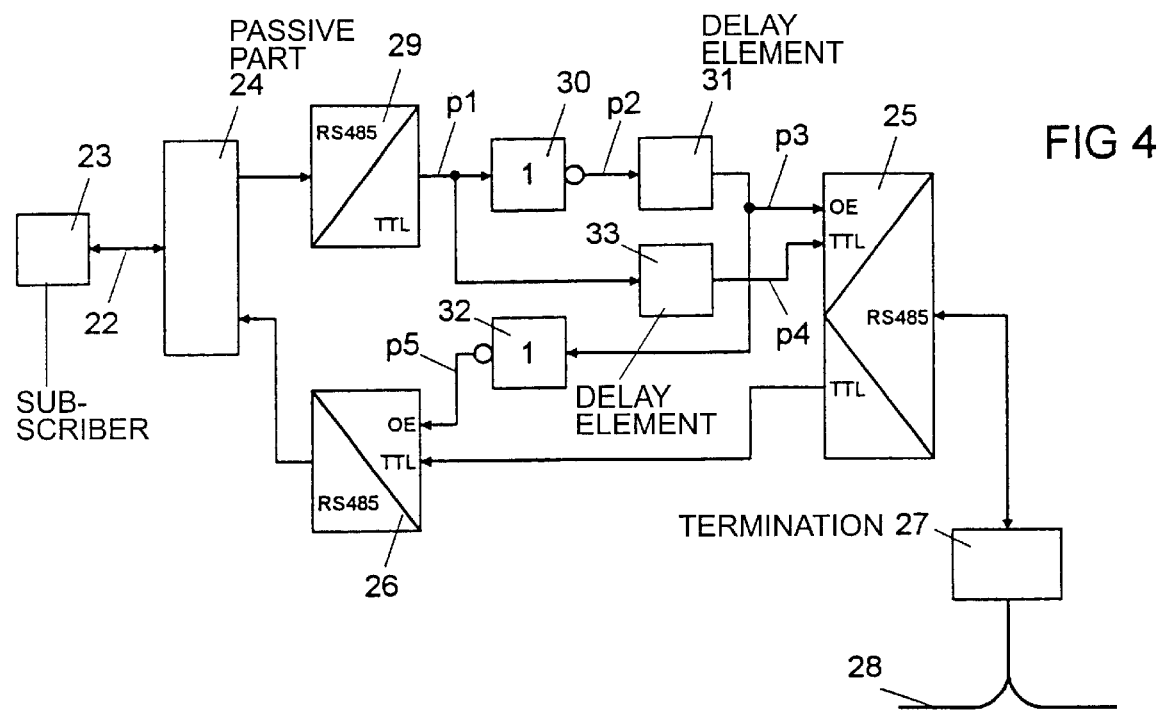
FIG. 4 shows a connection device for an RS 485 interface.

The described alternative for the direction determination has a disadvantage in that many active components are required for the active sampling of both interfaces of the connection device. Thus, the circuit for carrying out the direction determination has a high current-consumption and must be, in many cases, provided with an additional power supply for the connection device. FIG. 4 shows a simpler embodiment, which assumes a digitally voltage-level-coded data transmission on a branch line 22. The branch line 22 connects a subscriber 23 to a passive part 24 of a direction determination circuit of a connection device. An amplifier circuit includes a bidirectional TTL/RS 485 converter 25, for example of the 75ALS176B type from Texas Instruments, and a unidirectional TTL/RS 485 converter 26, for example of the 75ALS180 type from Texas Instruments. The converter 25, as already explained in FIG. 3, is connected to a bus line 28 via a termination 27, which can be switched on and off. Along with the passive part 24, other components of the direction determination circuit include an RS 485/TTL converter 29, which is more generally designated herein as a buffer, an inverter 30, and a delay element 31, which delays negative edges of an inverter output signal p2 by 500 ns. An output signal p3 of the delay element 31 is supplied as a direction determination signal to an input OE (output enable) of the converter 25 and, via an additional inverter 32, as an inverted signal p5 to an input OE of the converter 26. An output signal p1 of the buffer 29 corresponds to data transmitted by the subscriber 23. By an additional delay element 33, which uniformly delays negative and positive edges by 100 ns, accordingly delayed data are applied as a signal p4 to an input TTL of the converter 25. Thereby, with the signal p3, the converter 25 is switched to the active state before the signal p4 corresponds to the transmitted data. In this way, distortions caused by the converter 25 are kept small. In a transmitting mode of the subscriber 23, the digital value "0" is actively transmitted. Due to the delay elements 31 and 33, the digital value "1" is, in the active mode of operation of the converter 25, fed into the bus line 28 for only the first approximately 400 ns. Thereafter, the resting state level sets in on the bus line 28, which corresponds to the digital value "1" anyway, since the resting state level on the bus line 28 lies at about 1.1 V due to the prescribed termination at the ends of the line. In principle, transmission of the digital value "1" would thus not be necessary in the active mode and the delay element 31 could be omitted. By a short-term active transmission of the digital value "1", however, a rapid adjustment of the corresponding voltage level on the bus line 28 is achieved.

Figure 5:
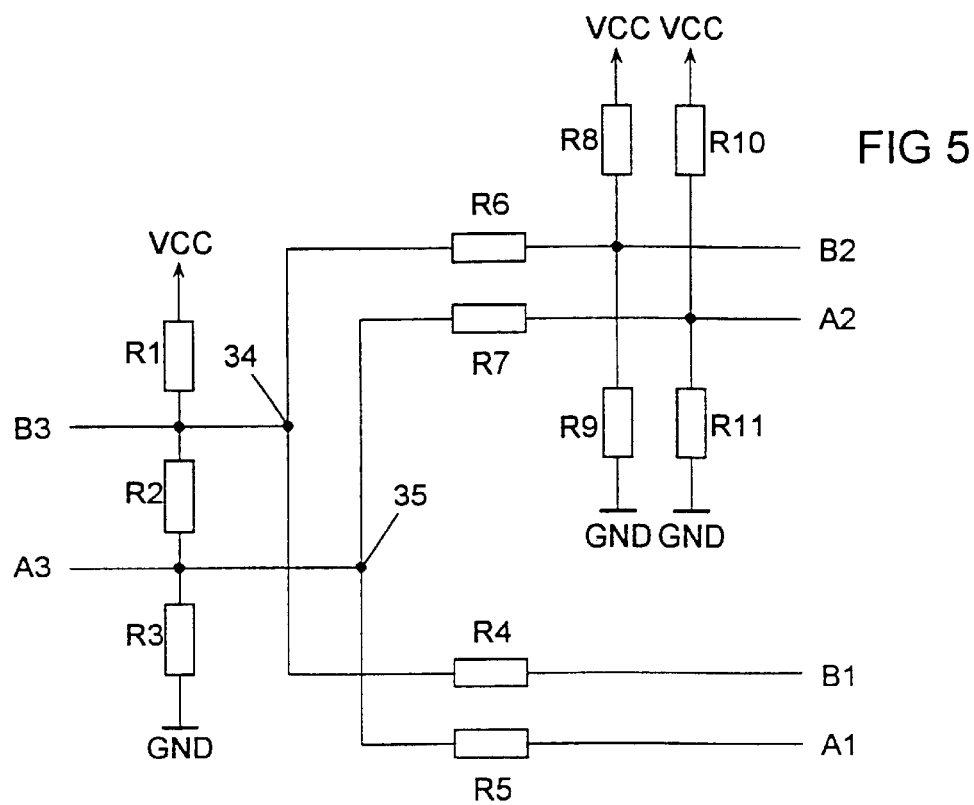
FIG. 5 shows a resistor network for the connection device according to FIG. 4.

With the aid of FIG. 5, the passive part 24 of the direction determination circuit represented in FIG. 4 will now be explained. The exemplary embodiment of FIG. 5 is designed for digitally voltage-level-coded data transmission with differential signals. For an alternative embodiment with non-differential signals, it would suffice to provide circuit elements for the line core, together with an accompanying signal ground and resistance values adapted to the pre-defined response thresholds of the then connected active components. In the circuit for differential signal transmission represented in FIG. 5, the signal cores of the connection between the subscriber 23 and the passive part 24, that is, the signal cores of the branch line 22 in FIG. 4, are designated with the reference characters B3 and A3. The signal cores of the connection between the passive part 24 and the buffer 29 bear the reference characters B2 and A2, and the signal cores of the connection between the passive part 24 and the converter 26 bear the reference characters B1 and A1. The resistor networks between the lines' signal cores B1, B2 and B3 or A1, A2 and A3, which correspond to one another, each correspond essentially to a respective star connection. In the one network, a 220 Ω series resistor R6 is connected between a star point 34 and the signal core B2, which is conducted to the buffer 29 (FIG. 4). Furthermore, a 220 Ω series resistor R4 is located between the star point 34 and the signal core B1. The star point 34 is connected directly to the signal core B3. A 390 Ω clamp resistor R8 against a power supply voltage VCC as well as a 560 Ω clamp resistor R9 against ground GND are connected to the signal core B2. Likewise, 1 kΩ clamp resistors R1 against VCC and respective 475 Ω and 1 kΩ clamp resistors R2 and R3 against ground GND are located in a series circuit on the signal core B3. A star point 35 of an additional resistor network for the signal cores A1, A2 and A3 is connected via a 220 Ω series resistor R7 to the signal core A2. Also, the star point 35 is connected to the signal core A1 via a 220 Ω series resistor R5. In addition, the star point 35 is directly connected to the signal core A3. Also provided on the signal core A2 are a 560 Ω clamp resistor R10 against the power supply voltage VCC and a 270 Ω clamp resistor R11 against the ground GND. The resistor R3 against the ground GND and a series circuit against VCC formed by the resistors R1 and R2 are used as clamp resistors for the signal core A3. Values for the resistors R1 . . . R11 of the resistor networks are selected such that a change in level, which is given by the output of the converter 26 (FIG. 4) to the resistor networks via the signal cores B1 and A1 and which corresponds to the change of a digital value, changes the level on the signal cores B3 and A3 (that is, on the branch line 22 (FIG. 4)) in such a way that the change of the digital value is detected at a connected input of the subscriber 23. However, the change in level changes the level on the signal cores B2 and A2, that is, at the input of the buffer 29 (FIG. 4), only slightly so that the change of the digital value cannot be detected at the buffer 29. Furthermore, by the dimensioning of the resistors R1 . . . R11 it is achieved that a change in level, which is given to the resistor networks by the branch line 22 (FIG. 4) via the signal cores B3 and A3 and which corresponds to a change of a digital value, changes the level at the input of the buffer 29 (FIG. 4) (that is, on the signal cores B2 and A2) in such a way that the change of the digital value is detected by the buffer 29. These effects are illustrated with the aid of the following list of voltage values. Therein, for example, a voltage value between the signal cores B1 and A1 is designated as $U_{B1A1}$. With IF/THEN statements, the following circumstance is presented in abbreviated form: If a voltage between two signal cores B1 and A1 or B3 and A3, which is specified in the IF-clause, is fed into the networks, then a voltage specified in the THEN-clause is set between the signal cores specified there. For the circuit example represented in FIG. 5, the following IF/THEN statements are specified:

IF $U_{B3A3}$~2.5 V, THEN $U_{B2A2}$~1.9 V,

IF $U_{B3A3}$~−2.5 V, THEN $U_{B2A2}$~−0.5 V,

IF $U_{B1A1}$~2.5 V, THEN $U_{B3A3}$~1.6 V and $U_{B2A2}$~1.5 V,

IF $U_{B1A1}$~−2.5 V, THEN $U_{B3A3}$~−0.3 V and $U_{B2A2}$~−0.6 V.

As the resting state level, that is, if no voltage is fed into the networks by any of the pairs of signal cores, the voltages $U_{B2A2}$~1.2 V and $U_{B3A3}$~1.1 V set in.

Thus, a digital value applied to the signal cores B1 and A1 is transmitted to the signal cores B3, A3, but not to the signal cores B2, A2. On the other hand, a digital value applied to the signal cores B3 and A3 is transmitted to the signal cores B2, A2. With the aid of the low phases of the voltage $U_{B2A2}$, which are detected with the buffer 29, it is thus possible to generate a direction determination signal. This type of direction determination has a small expenditure and a small power consumption for the components so that the connection device can be supplied with the required operation energy by power supply voltages originating from a connected subscriber.

Figure 6:
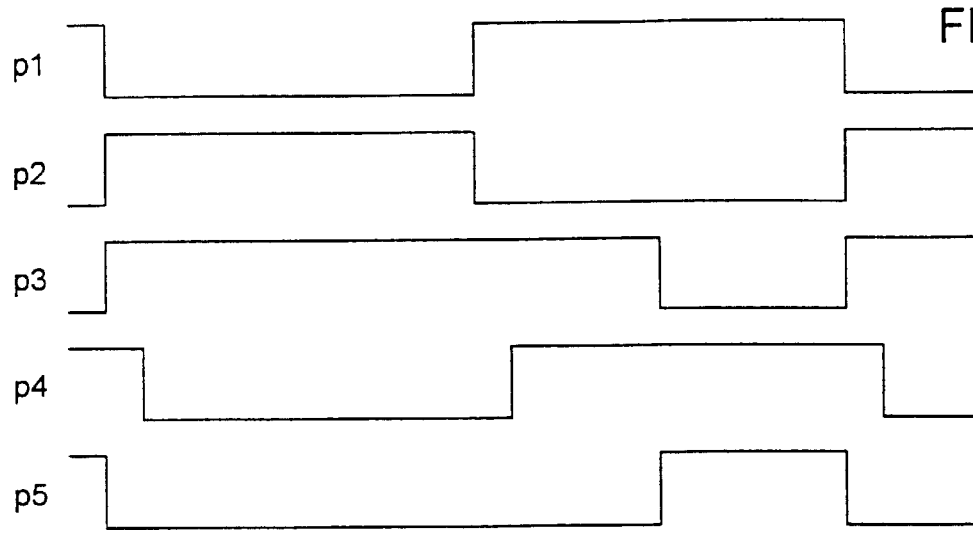
FIG. 6 shows a time diagram to illustrate the signal curves in the connection device according to FIG. 4.

The functionality of the circuit represented in FIG. 4 is further illustrated with the aid of the timing diagrams in FIG. 6. Starting from a resting state, the transmission of sequential digital values "0," "1," and "0" by the subscriber 23 is shown. These digital values are accordingly output as voltage levels of the signal p1 from the buffer 29. The signal p2 is obtained from the signal p1 by the inverter 30 and consequently corresponds to an inversion of signal p1. With the delay element 31, negative edges of the signal p2 are delayed by 500 ns, and thus the signal p3 is generated. With the signal p3, the converter 25 is switched into the active mode of operation and, the converter 26 is switched, via the inverter 32, into the inactive mode of operation, as must be the case in the case of a transmission of the subscriber 23 onto the bus line 28. By the delay element 33, the signal p1 is delayed by 100 ns so that the signal p4 reproduces the delayed transmission data. Thereby it is insured that the data are given to the bus line 28 with only little distortion. The inverter 32 generates the signal p5, which switches the converter 26, essentially during the transmission, into the inactive mode of operation.

In the opposite direction of transmission, that is, when data are to be transmitted from the bus line 28 to the subscriber 23, detection of the digital value "0" by the buffer 29 is prevented by the passive part 24 of the direction determination circuit. Consequently, during a transmission of data in this direction, the converter 25 is switched into the inactive mode of operation and the converter 26 is switched into the active mode of operation.

Figure 7:
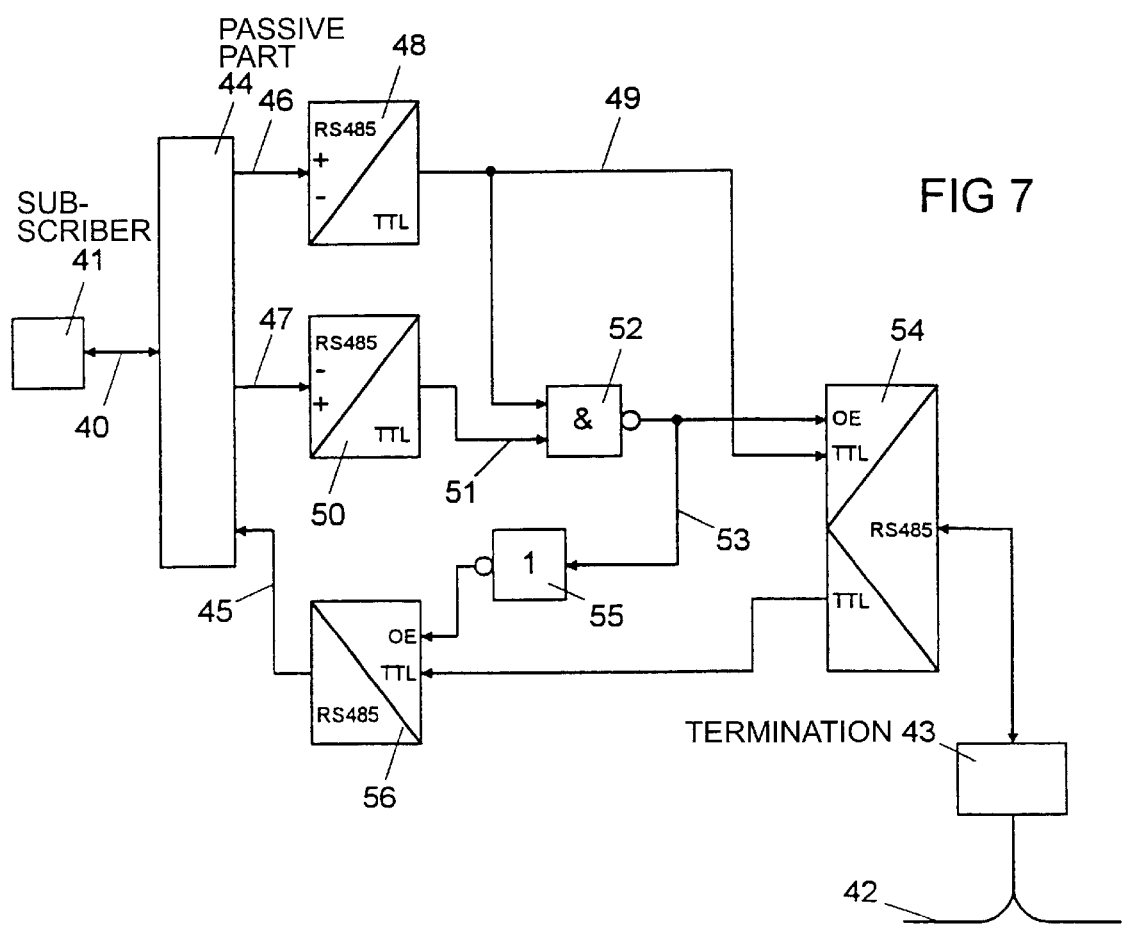
FIG. 7 shows a block circuit diagram of a further embodiment of the connection device according to the invention.
Figure 8:
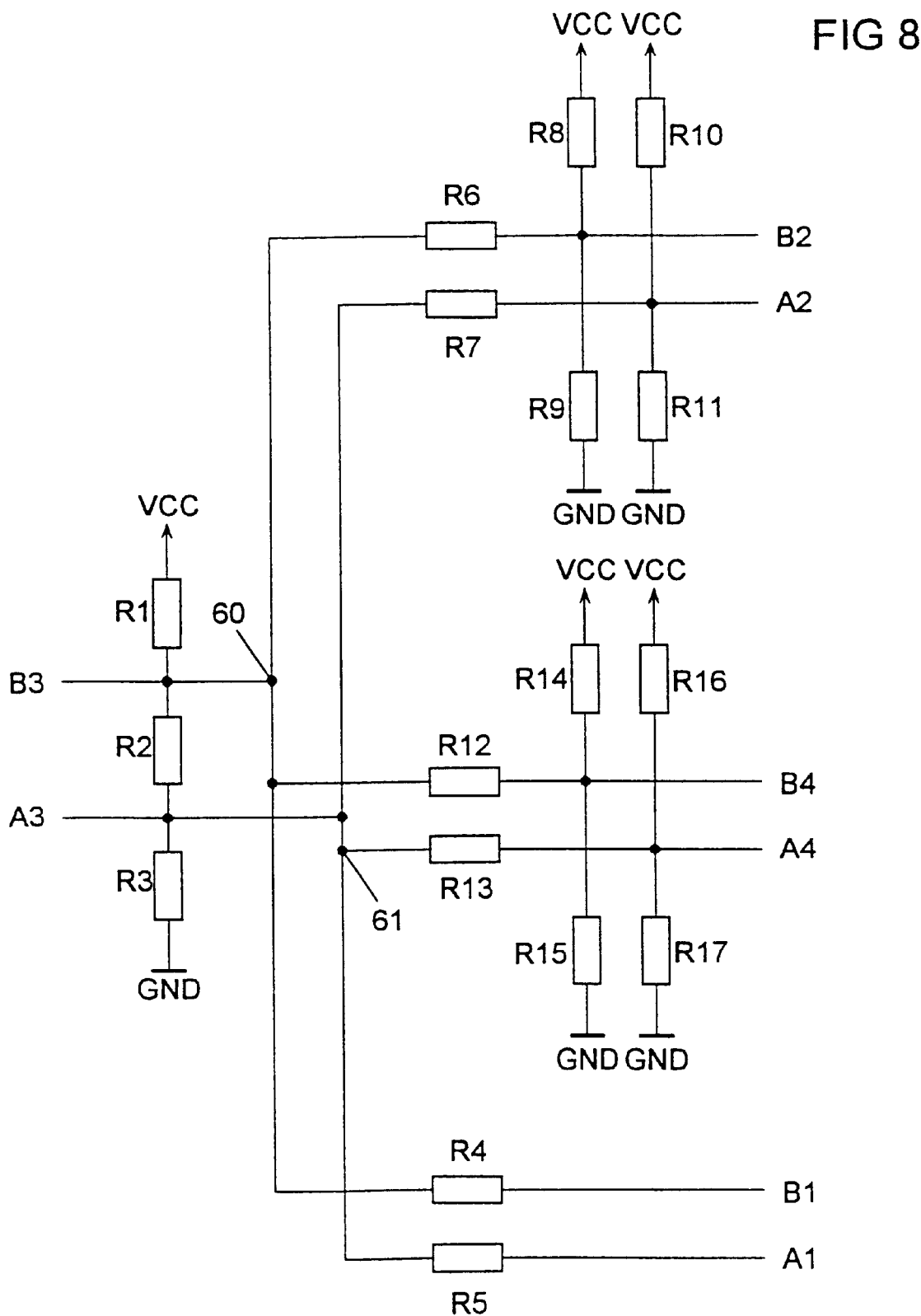
FIG. 8 shows a resistor network for the connection device according to FIG. 7.

FIGS. 7 and 8 show another embodiment of a device for connecting a subscriber to a bus line. A subscriber 41 is connected to the connection device by a branch line 40. The connection device itself is in turn connected to a bus line 42 via a termination 43, which can be connected to the bus line 42, depending on the site at which the termination 43 is mounted. A passive part 44 of a direction determination circuit corresponds in structure and function essentially to the circuit according to FIG. 5 and is represented in detail in FIG. 8. Equal resistances are provided with the same reference numbers. In order to obtain the passive part according to FIG. 8, signal cores B4 and A4 of an additional line are conducted, via 180 Ω series resistors R12 or R13, to respective star points 60 or 61 of the resistor networks, which correspond to the star points 34 or 35 in FIG. 5. The signal core B4 is additionally connected, via a 560 Ω clamp resistor R14, against the power supply voltage VCC and, via a 270 Ω clamp resistor R15, against the ground GND. Also provided on the signal core A3 are a 270 Ω clamp resistor R16 against the power supply voltage VCC and a 560 Ω clamp resistor R17 against the ground GND. In FIG. 7, the signal cores B1 and A1 are drawn in as a line 45, the signal cores B2 and A2 are drawn in as a line 46, the signal cores B3 and A3 are drawn in as a line 40, and the signal cores B4 and A4 are drawn in as a line 47. The line 46 is conducted onto an RS 485/TTL converter 48, which detects voltage values corresponding to the digital value "0." On the detection of the digital value "0", a low level is output on a line 49. The line 47 is connected, with reversed polarity of the signal cores, to an RS 485/TTL converter 50, which is provided for the detection of voltage levels corresponding to the digital value "1." The reversal of the connection polarity is indicated by exchanged "+" and "−" signs at the inputs of the converters 48 and 50. Due to the chosen connection polarity, the converter 50 outputs a low-level on a line 51 upon detection of the digital value "1." By a linking element 52 of the type of a NAND gate, the signals on the lines 49 and 51 are linked to a signal 53 (driver enable), which is supplied to an input OE of a bi-directional TTL/RS 485 converter 54, and via an inverter 55 to an input OE of a uni-directional TTL/RS 485 converter 56. The function of the passive part 44 of the direction determination circuit, which is represented in detail in FIG. 8, will be explained with the aid of IF/THEN statements. These are:

IF $U_{B1A1}$~2.5 V, THEN $U_{B2A2}$~1.1 V and $U_{B3A3}$~1.0 V and $U_{B4A4}$~−0.4 V, IF $U_{B1A1}$~−2.5 V, THEN $U_{B2A2}$~0.4 V and $U_{B3A3}$~−0.5 V and $U_{B4A4}$~−1.1 V, IF $U_{B3A3}$~2.5 V, THEN $U_{B2A2}$~1.9 V and $U_{B4A4}$~0.4 V, IF $U_{B3A3}$~−2.5 V, THEN $U_{B2A2}$~−0.5 V and $U_{B4A4}$~−2.1 V.

In the resting state, that is, when all the outputs of the active components, which are connected to the passive part of the direction determination network, are connected with high resistance values or are switched into the inactive state, the following voltages set in:

$U_{B2A2}$~0.8 V, $U_{B3A3}$~0.3 V and $U_{B4A4}$~−0.7 V.

As long as the subscriber 41 does not send data onto the branch line 40, the signal 53 (driver enable) has a low-level, by which the converter 54 is switched into the inactive mode of operation and the converter 56 is switched into the active mode of operation, so that the subscriber 41 can receive data from the bus line 42. However, as soon as the subscriber 41 switches into the transmission mode, a digital value "0" or a digital value "1" is detected either by the buffer 48 or by the buffer 50, a high level of the signal 53 is generated, and the transmission direction is reversed so that the subscriber 41 now transmits data onto the bus line 42.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A device to connect a subscriber to a bus line for bi-directional data transmission, comprising:

a branch line to connect the subscriber with the device;

an amplifier circuit to selectively transmit signals from the bus line to the branch line and from the branch line to the bus line, wherein the amplifier circuit has a high-resistance input at the bus line and has outputs structured to be switched between an active operation mode and an inactive operation mode, wherein, in the active operation mode, a respective connected one of the bus line and the branch line is structured to be driven by the signals received by a respective other one of the branch line and the bus line, and wherein, in the inactive operation mode, at least one of the outputs has a high resistance; and a direction determination circuit to detect if the signals are to be transmitted from the bus line to the branch line or from the branch line to the bus line, and to activate a respective one of the outputs;

wherein a data transmission on the branch line is digitally voltage-level-coded with predetermined response thresholds to detect digital values, wherein the direction determination circuit comprises a first resistor network and a first buffer to generate a first determination signal, wherein the first resistor network corresponds to a star connection, the first resistor network comprising:

a first series resistor arranged between a first star point of the star connection and an input of the first buffer;

a second series resistor arranged between the first star point and one of the outputs of the amplifier circuit located on a branch line side of the amplifier circuit;

a connection of the first star point with the branch line; and first clamp resistors, at the input of the buffer and at the branch line, against power supply voltages, wherein the first series resistor, the second series resistor, and the first clamp resistors are dimensioned such that:

a first change of a voltage level changes the voltage level on the branch line such that a change of at least one digital value is detected at a connected input of the subscriber, wherein the first change of the voltage level is supplied from the at least one output of the amplifier circuit to the first resistor network and corresponds to the change of the at least one of the digital values, and the first change of the voltage level changes the voltage level at the input of the buffer only slightly so that the change of the at least one digital value is not detected at the first buffer, and wherein the first series resistor, the second series resistor, and the first clamp resistors are dimensioned such that a second change of the voltage level changes the voltage level at the input of the first buffer such that the change of the digital value is detected by the first buffer, wherein the second change of the voltage level is supplied from the branch line to the first resistor network and corresponds to the change of the at least one digital value.

2. The device of claim 1, further comprising a power connection for receiving an operation voltage from the subscriber.

3. The device of claim 1, wherein the data transmission on the branch line is differential, wherein lines for the differential data transmission are formed as a respective pair of cores, wherein the direction determination circuit comprises the first resistor network and a second resistor network for the respective cores, and wherein, at the branch line, the first clamp resistors against the power supply voltages are arranged according to a bleeder chain and comprise:

a first resistor interposed between a positive one of the power supply voltages and a first one of the cores;

a second resistor interposed between the first one of the cores and a second one of the cores; and a third resistor interposed between the second one of the cores and a further one of the power supply voltages, the further power supply voltage being either a negative voltage or ground.

4. The device of claim 3, wherein the direction determination circuit comprises the first buffer and at least a second buffer, the buffers respectively corresponding to each of the digital values and generating at least the first determination signal and a second determination signal, wherein the respective resistor networks for each core comprise:

respective series resistors between respective star points and respective inputs of the respective buffers; and at the respective inputs of the respective buffers, respective clamp resistors against the power supply voltages, and wherein the direction determination circuit further comprises a linking element structured to generate a direction determination signal from the determination signals of the respective buffers.

5. A transmission direction determination circuit of a device to connect a subscriber to a bus line for bidirectional data transmission, comprising:

a connection to a branch line connecting the subscriber to the circuit;

an amplifier circuit transmitting signals between the bus line and the subscriber, wherein data transmission of the signals on the branch line is digitally voltage-level-coded with predetermined response thresholds to detect digital values;

a resistor network and a buffer to generate a determination signal, wherein the resistor network corresponds to a star connection and comprises:

a first series resistor arranged between a star point of the star connection and an input of the buffer, wherein the star point is further connected to the connection to the branch line;

a second series resistor arranged between the star point and an output of the amplifier circuit located on a branch line side of the amplifier circuit; and clamp resistors, at the input of the buffer and at the branch line, against the power supply voltages, wherein the first series resistor, the second series resistor, and the clamp resistors are dimensioned such that:

a first change of a voltage level changes the voltage level on the branch line such that a change of the at least one digital value is detected at the connection to the branch line, wherein the first change of the voltage level is supplied from the one output of the amplifier circuit to the resistor network and corresponds to the change of the at least one digital value, and the first change of the voltage level changes the voltage level at the input of the buffer only slightly so that the change of the at least one digital value is not detected at the buffer, and wherein the first series resistor, the second series resistor, and the first clamp resistors are dimensioned such that a second change of the voltage level changes the voltage level at the input of the buffer such that the change of the digital value is detected by the buffer, wherein the second change of the voltage level is supplied from the branch line to the resistor network and corresponds to the change of the at least one digital value.

6. The circuit of claim 5, wherein the data transmission on the branch line is differential, wherein lines for the differential data transmission are formed as a respective pair of cores, wherein the circuit comprises the resistor network and a further resistor network for the respective cores, and wherein, at the branch line, the clamp resistors against the power supply voltages are arranged according to a bleeder chain and comprise:

a first resistor interposed between a positive one of the power supply voltages and a first one of the cores;

a second resistor interposed between the first one of the cores and a second one of the cores; and a third resistor interposed between the second one of the cores and either a negative voltage or ground.

7. The circuit of claim 6, wherein the circuit comprises the buffer and at least one further buffer, the buffers respectively corresponding to each of the digital values and generating at least the determination signal and a further determination signal, wherein the resistor networks for the respective cores comprise:

respective series resistors between respective star points and respective inputs of the respective buffers; and at the respective inputs of the respective buffers, respective clamp resistors against the power supply voltages, and wherein the circuit further comprises a linking element that generates a direction determination signal from the determination signals of the respective buffers.

8. A bus system, comprising:

at least one bus line;

at least one subscriber having an input;

a branch line to connect the subscriber to the bus line;

a signal direction detection circuit to detect a direction of a signal between the bus line and the subscriber;

an amplifier circuit having at least one output to transmit the signal from the bus line to the subscriber, wherein, on the branch line, the signal is digitally voltage-level-coded with predetermined response thresholds to detect digital values; and at least one resistor network and at least one buffer to generate a first signal direction determination signal, the resistor network comprising:

a first series resistor arranged between a connection point of the resistor network and an input of the buffer;

a second series resistor arranged between the connection point and the at least one output of the amplifier circuit, the at least one output being located on a branch line side of the amplifier circuit;

a line between the connection point and the branch line; and clamp resistors connected to power supply voltages, the clamp resistors being arranged at the input of the buffer and at the branch line, wherein resistance values of the first series resistor, the second series resistor, and the clamp resistors are selected such that a first change of a first voltage level of a first signal from the bus line to the subscriber corresponds to a first change of a first one of the digital values so that the input of the subscriber is structured to detect the first change of the first digital value and so that the buffer is structured to not detect the first change of the first digital value; and wherein the resistance values of the first series resistor, the second series resistor, and the clamp resistors are selected such that a second change of a second voltage level of a second signal from the subscriber to the bus line corresponds to a second change of a second one of the digital values so that the buffer is structured to detect the second change of the second digital value.

9. A transmission direction detection circuit of a device, which connects a subscriber to a bus line via a branch line and which has an amplifier circuit for a signal transmission from the bus line to the branch line, wherein the signal transmission on the branch line is digitally voltage-level-coded with predetermined response thresholds to detect digital values, the transmission direction detection circuit comprising:

at least one resistor network and at least one buffer to generate a first signal direction determination signal, the resistor network comprising:

a first series resistor arranged between a connection point of the resistor network and an input of the buffer;

a second series resistor arranged between the connection point and the at least one output of the amplifier circuit, the at least one output being located on a branch line side of the amplifier circuit;

a line between the connection point and the branch line; and clamp resistors connected to power supply voltages, the clamp resistors being arranged at the input of the buffer and at the branch line, wherein resistance values of the first series resistor, the second series resistor, and the clamp resistors are selected such that a first change of a first voltage level of a first signal from the bus line to the subscriber corresponds to a first change of a first one of the digital values so that the input of the subscriber is structured to detect the first change of the first digital value and so that the buffer is structured to not detect the first change of the first digital value; and wherein the resistance values of the first series resistor, the second series resistor, and the clamp resistors are selected such that a second change of a second voltage level of a second signal from the subscriber to the bus line corresponds to a second change of a second one of the digital values so that the buffer is structured to detect the second change of the second digital value.

* * * * *